(12) United States Patent
Simeonidis et al.

(10) Patent No.: US 8,360,495 B2
(45) Date of Patent: Jan. 29, 2013

(54) VEHICLE SEAT

(75) Inventors: Antonios Simeonidis, Wuppertal (DE); Frank Gerhardt, Cologne (DE); Jorg Mantke, Leverkusen (DE)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 12/513,942

(22) PCT Filed: Nov. 16, 2007

(86) PCT No.: PCT/EP2007/009914
§ 371 (c)(1),
(2), (4) Date: Dec. 28, 2009

(87) PCT Pub. No.: WO2008/058747
PCT Pub. Date: May 22, 2008

(65) Prior Publication Data
US 2010/0117398 A1     May 13, 2010

(30) Foreign Application Priority Data

Nov. 16, 2006 (DE) .................... 10 2006 054 443
Apr. 10, 2007 (DE) .................... 10 2007 017 090

(51) Int. Cl.
*B60J 5/04* (2006.01)
*B60R 13/00* (2006.01)
(52) U.S. Cl. ............ 296/39.1; 296/146.7; 296/146.6; 296/1.08; 280/751
(58) Field of Classification Search ............ 296/146.6, 296/146.7, 39.1, 1.08; 280/751
See application file for complete search history.

(56) References Cited

U.S. PATENT DOCUMENTS

| | | | | |
|---|---|---|---|---|
| 3,744,835 A | * | 7/1973 | Carbone et al. | 293/120 |
| 3,834,482 A | * | 9/1974 | Wada et al. | 180/90 |
| 4,270,328 A | * | 6/1981 | Page et al. | 52/511 |
| 5,306,066 A | * | 4/1994 | Saathoff | 296/146.6 |
| 5,356,177 A | * | 10/1994 | Weller | 280/751 |
| 5,435,619 A | | 7/1995 | Nakae et al. | |
| 6,007,469 A | * | 12/1999 | Jaegers et al. | 493/367 |
| 6,126,231 A | * | 10/2000 | Suzuki et al. | 296/187.05 |
| 6,142,563 A | * | 11/2000 | Townsend et al. | 297/216.1 |
| 6,158,771 A | * | 12/2000 | Nusser et al. | 280/752 |

(Continued)

FOREIGN PATENT DOCUMENTS

| | | |
|---|---|---|
| DE | 10304689 | 8/2004 |
| DE | 102004034124 A1 | 2/2006 |

(Continued)

OTHER PUBLICATIONS

International Search Report for application No. PCT/EP2007/009914 mailed Mar. 11, 2008.

(Continued)

*Primary Examiner* — Dennis Pedder
(74) *Attorney, Agent, or Firm* — Fletcher Yoder P.C.

(57) ABSTRACT

A fixture, in particular for a motor vehicle, comprises a first partial region and a second partial region. The first partial region is integrally connected to the second partial region by a connecting region. The first partial region is configured to permit the pre-assembly thereof relative to the second partial region by the connecting region. The connecting region may permit the first partial region to be movable, such as foldable relative to the second partial region.

9 Claims, 1 Drawing Sheet

U.S. PATENT DOCUMENTS

| | | | |
|---|---|---|---|
| 6,170,861 B1 * | 1/2001 | Tietze | 280/730.2 |
| 7,413,237 B2 * | 8/2008 | Heinze et al. | 296/146.7 |
| 2005/0194767 A1 * | 9/2005 | Freisler et al. | 280/728.2 |
| 2006/0175858 A1 * | 8/2006 | Pegorier et al. | 296/70 |

FOREIGN PATENT DOCUMENTS

| | | |
|---|---|---|
| JP | 2010016556 | 1/2010 |
| WO | 9525646 A1 | 9/1995 |
| WO | 2005116478 | 12/2005 |
| WO | 2006100362 | 9/2006 |

OTHER PUBLICATIONS

Japanese Notice of Reasons for Rejection mailed Aug. 28, 2012.

* cited by examiner

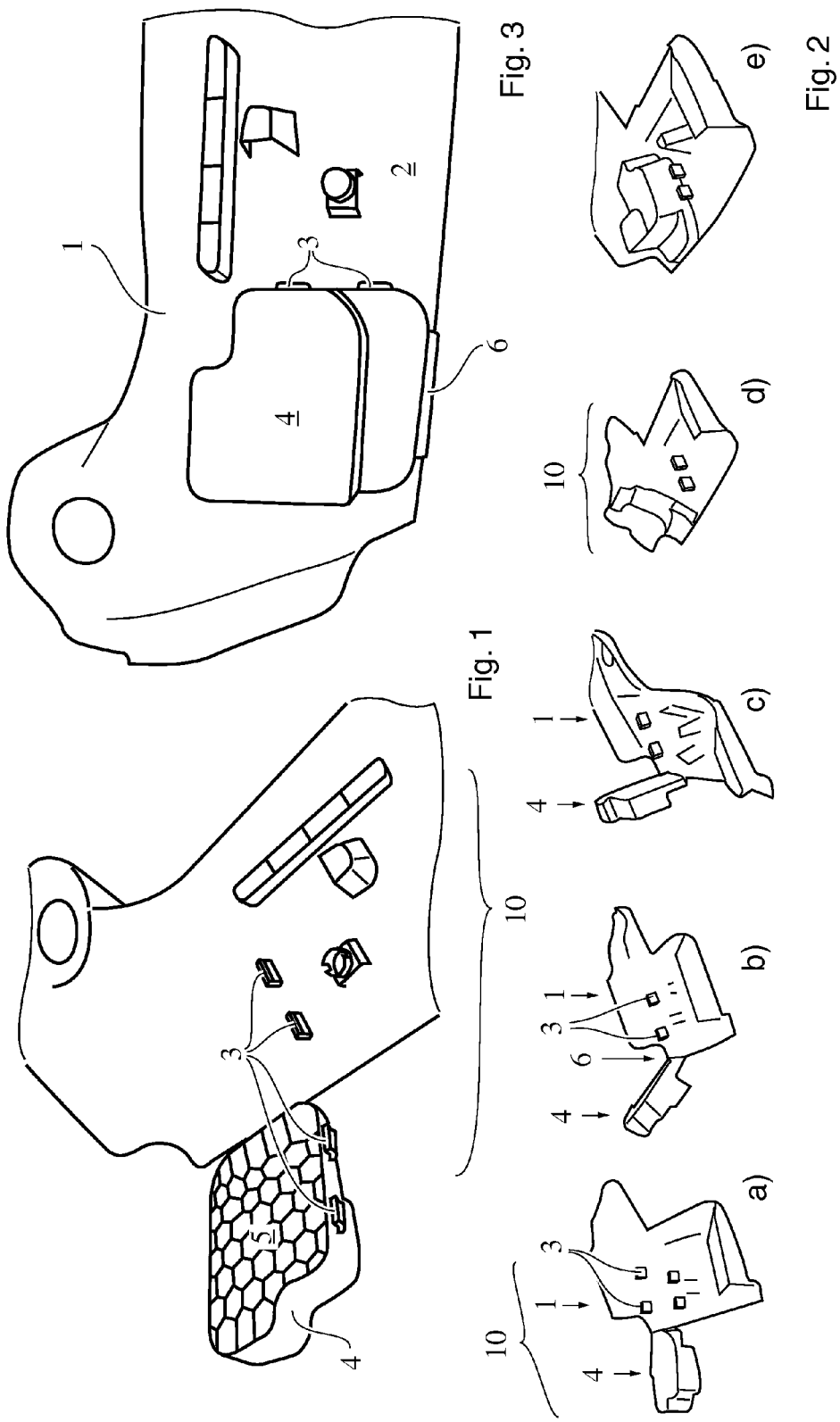

VEHICLE SEAT

CROSS REFERENCE TO RELATED APPLICATIONS

This application claims priority from and the benefit of PCT Application No. PCT/EP2007/009914, filed on Nov. 16, 2007; German Patent No. DE 10 2006 054 443.9, filed on Nov. 16, 2006; and German Patent DE 10 2007 017 090.6, filed on Apr. 10, 2007; all entitled "Fixture, in Particular for a Motor Vehicle, With a First Partial Region and a Second Partial Region Which is Integrally Attached by Means of a Connecting Region", which are herein incorporated by reference.

BACKGROUND

The present invention relates to a fixture, in particular for a motor vehicle, with a first partial region and with a second partial region, the first partial region being integrally connected to the second partial region by means of a connecting region.

Such fixtures are, in particular, generally known for vehicle interior linings. For example, a reinforcing part for an impact protector of a side region of a motor vehicle is known from the German published patent application DE 10 2004 034 124 A1, the reinforcing part comprising a framework made up of bars connected to one another. The bars are, in this connection, made from plastics and designed in a honeycomb structure. A drawback with the prior art is that when manufacturing the honeycomb structure together with the fixture it is not able to be prevented that the honeycomb structure is, at least in indicative fashion, visible on the front face (i.e. the side of the fixture remote from the honeycomb structure).

SUMMARY

It is, therefore, the object of the present invention to provide a fixture, in particular for a motor vehicle, with a first partial region and with an integrally connected second partial region, the fixture being able to fulfill a plurality of functions, in particular damping functions as well as visually aesthetic functions and is also able to be produced in a manner which is weight-saving, cost-saving, lightweight and simple.

The object is achieved by a fixture, in particular for a motor vehicle, with a first partial region and with a second partial region, the first partial region being integrally connected to the second partial region by means of a connecting region, and the first partial region being provided such that it may be pre-assembled relative to the second partial region by means of the connecting region.

As a result, according to the invention it is possible in a particularly cost effective manner to provide an integral component to fulfill a plurality of different functions, pre-assembly in particular being provided for implementing these different functions—namely folding up the second partial region—in order to install the fixture in a motor vehicle and/or in a motor vehicle component.

According to the invention, it is preferable that by means of the connecting region the first partial region is provided to be movable, in particular foldable, relative to the second partial region. As a result, it is possible in a particularly simple and intuitive manner to allow the first partial region to be pre-assembled relative to the second partial region, an incorrect positioning and/or pre-assembly of the partial regions relative to one another not being possible and/or being excluded to the greatest possible extent.

Moreover, it is preferred according to the invention that the first partial region and/or the second partial region comprises a fastening element for pre-assembling the first partial region relative to the second partial region. As a result, the pre-assembly may be undertaken in an extremely simple and reliable manner and the complete range of functions of the fixture may be implemented.

Moreover, it is preferred according to the invention that in the pre-assembled state the first partial region is arranged irreversibly relative to the second partial region. As a result, malfunctions which may be caused by a further release of the arrangement of the first partial region relative to the second partial region after pre-assembly, which might otherwise be possible, may be substantially avoided. Moreover, it is possible, as a result, that the likelihood of errors during the assembly of the fixture is further reduced, namely as the possibility of misuse and/or a faulty arrangement of the partial regions of the fixture is considerably reduced. As an alternative to the irreversible connection and/or arrangement shown of the first partial region relative to the second partial region, it may be provided according to the invention, and naturally also preferably, that the partial regions are arranged reversibly relative to one another. This could, for example, have advantages in the case of repair work or the like, which for example requires a replacement of the fixture or a dismantling of the fixture.

Moreover, it is preferred according to the invention that the first partial region primarily has a cladding function. As a result, the fixture must fulfill a specific visual and/or aesthetic function, in particular at least one side and/or a partial region of one side of the fixture is provided as a so-called visible side, i.e. such a side which may be viewed by a user, in particular a vehicle user, provided said user is located in a normal position of use in or outside the vehicle.

According to the invention, it is further preferred that the first partial region has a visible side, in particular on the side remote from the second partial region in the pre-assembled state. As a result, according to the invention, to a certain extent it is possible both to produce the two partial regions integrally connected to one another and also to produce a visually attractive visible side.

Moreover, it is specifically preferred according to the invention that the second partial region primarily has an absorption function and/or a damping function. As a result, apart from the visual-aesthetic functions of the fixture, safety functions may be incorporated in the fixture in an integrated manner and thus very cost-effectively, so that overall the level of safety of the motor vehicle may be easily increased in a cost-effective manner.

It is particularly preferred that the second partial region has a honeycomb structure and/or in that the connecting region is provided as a film hinge. As a result, the absorption function and/or the damping function and the capacity for easy pre-assembly of the second partial region may be implemented in a particularly simple manner.

A further subject of the present invention is a method for producing a fixture according to the invention, the first partial region and the second partial region being molded substantially at the same time. As a result, costs may be specifically saved during the production of the fixture and yet a fixture with a plurality of functions may be provided. Moreover, by creating this plurality of functions, by means of a single fixture (integral production) it is ensured that there does not have to be any unnecessary logistical complexity, namely as a result of a plurality of part numbers or the like, but the number of components required for implementing the functions and thus the costs may be reduced.

DRAWINGS

Exemplary embodiments of the invention are shown in the drawings and described in more detail in the following description.

FIG. 1 shows a fixture according to the invention with a first partial region and a second partial region in a first position relative to one another.

FIG. 2 shows, in different partial views, different relative positions of the two partial regions relative to one another.

FIG. 3 shows the fixture in a pre-assembled state and/or in a pre-assembled adjusted position of the partial regions relative to one another.

DETAILED DESCRIPTION

In FIGS. 1, 2 and 3 one respective fixture 10 is shown, which has a first partial region 1 and a second partial region 4. The partial regions 1, 4 are connected integrally to one another via a connecting region 6 and the partial regions 1, 4 are provided to be able to be pre-assembled, in particular folded, relative to one another by means of the connecting region 6. As a result, it is possible according to the invention in a particularly simple manner and relatively cost-effectively, to provide a fixture 10, in particular for the interior of a motor vehicle, which has a front face visible by a user of the motor vehicle in a normal sitting or observation and/or viewing position and a rear face 2 hidden from the view of the seat user and/or motor vehicle user, after the installation of the fixture 10, a reinforcing element 4 being provided in the region of the rear face 2 as a second partial region 4 of the fixture 10. The reinforcing or damping element, for example for absorbing impacts or even acoustic vibrations or the like, may for example support and/or acoustically insulate the fixture 10 in the case of an accident or even in the case of acoustic interference from a body wall or other fitting and/or other vehicle structures at the rear i.e. facing the rear face 2. In this connection, the fixture 10 has on its front and/or visible face opposing the rear face 2 a structure and/or is correspondingly designed so that the comfort requirements with regard to the haptics and/or the comfort and/or aesthetic requirements with regard to the visual aspect and/or aesthetics of a seat user and/or a vehicle user specifically may be taken into account. The reinforcing element 4 (not visible to the vehicle user) does not have to satisfy these visual-aesthetic requirements, but must fulfill other requirements with regard to the stability, the damping or the like. According to the invention, for reducing the number of components and for simplifying the logistical requirements and the assembly cost and thus, as a whole, for the cost-effective production of a motor vehicle and/or a motor vehicle seat, the fixture 10 is to be provided as an integrated and/or integral fixture 10, which integrally encompasses the reinforcing element 4 in the second partial region 4. In this connection, reference may be made to known methods for the integral production of, for example, plastics parts by injection molding, pressure die casting or the like. A direct attachment and/or positioning of the second partial region 4, provided in contrast to the present invention, at the position of the second partial region 4 provided in the installed state, may in this case become considerably more expensive or complicated, by the visual quality of the front face of the first partial region 1, for example, in particular in the region of the reinforcing element 4 and/or of the second partial region 4 being impaired by sink marks, flowmarks or other markings.

According to the present invention, a fixture 10 which is able to be produced cost-effectively and easily with the first partial region 1 and the second partial region 4, is produced by the joining of the partial regions 1, 4 to one another being ensured by means of the connecting region 6, but due to the positioning of the first partial region 1 and the second partial region 4, which is at relatively long intervals during production, the process parameters for producing the partial regions 1, 4 may be selected so that said parameters are able to be respectively matched in an optimal manner to the functionality and/or functions of the individual partial regions 1, 4 to be fulfilled. In particular, as a result it is also possible that the molding of the first and/or second partial region 1, 4 is possible with a greater flexibility, as for example undercuts on the first partial region 1 are possible in the vicinity of the second partial region 4 to be positioned later, which would not be possible when producing the second partial region 4 at the exact point of the subsequent position of the second partial region 4 relative to the first partial region 1.

Preferably, due to the flexibility of the connecting region 6 the second partial region 4 is foldably fastened on the first partial region 1, so that by folding up the second partial region 4 a pre-assembly of the second partial region 4 on the first partial region 1 is possible. This is shown in FIG. 2 with reference to a plurality of partial images. In FIG. 2a, for example, the positioning of the two partial regions 1, 4 relative to one another is shown, as is the case during the molding process and/or during the production process of the fixture 10. In FIGS. 2b, 2c and 2d successively a folding up of the second partial region 4 about the connecting region 6, configured in the example as a film hinge, is shown. In FIGS. 2a to 2d, a plurality of fastening elements 3 is visible particularly clearly, which are arranged either on the first partial region 1 or on the second partial region 4 or on both partial regions 1, 4 such that in the latched position and/or pre-assembled position of the second partial region 4 relative to the first partial region 1, shown in FIG. 2e a fastening, in particular a latching, of the second partial region 4 to the first partial region 1 takes place. This pre-assembled state of the second partial region 4 relative to the first partial region 1 is also shown again in FIG. 3, further enlarged. The second partial region 4 and/or the reinforcing element 4 may, for example, have a honeycomb structure 5 shown in FIG. 1, by means of which, for example in the event of an accident, energy may be dissipated by deformation. Moreover, the reinforcing element 4 and/or the second partial region 4 may have a dish-shaped structure around the honeycomb structure 5. It is, however, also possible according to the invention that the honeycomb structure 5 is not combined with a dish-shaped structure. Moreover, according to the invention it could also be provided that the part of the plastics molding tool (not shown) which corresponds to the subsequent second partial region 4, comprises an insert or the like, for example made of a damping material or having any other function, so that such an insert and/or such a reinforcing and/or damping and/or absorption layer and/or a corresponding material is arranged either on the side facing the first partial region 1 in the pre-assembled state of the second partial region 4, or on the opposing side (rear face of the second partial region 4). In particular with a honeycomb structure 5 formed during the production and/or molding process of the fixture 10 on the rear face 2 of the first partial region 1, this honeycomb structure 5—in particular with a relatively small thickness of the first partial region 1 designed in the manner of a cover—would stand out on the front side and/or visible side of the first partial region 1.

According to the invention, it is provided by way of example that the reinforcing element 4 and/or the second partial region 4 of the fixture 10 is connected by a connecting region 6 configured as a film hinge to the first partial region 1 and/or the cover 1. This may take place during manufacture by injection-molding, for example, by the cavity for the reinforcing element 4, in the injection molding tool (not shown), being arranged in a position adjacent to the cavity for the cover 1 and/or the first partial region 1 and in a position rotated by 180° relative to the subsequent installation position, and both cavities being connected by a thin recess for the film hinge and/or for the connecting region 6. After removing the fixture 10 thus produced from the mold, the reinforcing part 4 and/or the second partial region 4 (as shown in the movement sequence according to FIG. 2a to FIG. 2e), by bending the film hinge of the connecting region 6, may be folded onto the rear face 2 of the first partial region 1 and latched there by means of the fastening elements 3 configured, in particular, as latching hooks. In this state, the second partial region 4 is pre-assembled and the fixture 10 thus pre-assembled may be subsequently integrated in the vehicle seat and/or at any other point of the vehicle.

By means of the structure of the fixture 10 according to the invention, in a particularly simple and flexible manner, different functional requirements of different regions of the fixture 10 may be taken into account and yet a simple and cost-effective producibility of the fixture 10 may be ensured, the possibility of error during pre-assembly of the second partial region 4 relative to the first partial region 1, for example, being able to be additionally avoided by merely one folding direction and/or folding movement being possible.

The invention claimed is:

1. A fixture for an interior of a motor vehicle, comprising a first partial region and a second partial region, the first partial region being integrally connected to the second partial region by a connecting region, wherein the first partial region is provided such that the first partial region may be pre-assembled relative to the second partial region by the connecting region, the first partial region has a front side on a side remote from the second partial region when pre-assembled relative to the first partial region, the front side is visible by an occupant of the motor vehicle when the fixture is installed within the motor vehicle, the first partial region has a back side opposite the front side, the first partial region comprises a cladding function, and the second partial region comprises a honeycomb structure and a damping function;
   wherein the first partial region and the second partial region comprise fastening elements for pre-assembling the first partial region relative to the second partial region, and the connecting region comprises a film hinge;
   wherein the second partial region is folded about 180 degrees onto the back side of the first partial region when pre-assembled by bending the film hinge such that the honeycomb structure of the second partial region is in a facing relation with the back side of the first partial region, and the second partial region is latched to the back side of the first partial region when pre-assembled by the fastening elements; and
   wherein the second partial region includes a dish-shaped structure around the honeycomb structure.

2. The fixture as claimed in claim 1, wherein the connecting region is provided such that the first partial region is movable relative to the second partial region.

3. The fixture as claimed in claim 1, wherein the first partial region is configured to be permanently pre-assembled relative to the second partial region.

4. A method for producing a fixture as claimed in claim 1, wherein the first partial region and the second partial region are molded substantially at the same time.

5. The fixture as claimed in claim 2, wherein the connecting region is provided such that the first partial region is foldable onto the second partial region.

6. A motor vehicle interior fixture, comprising:
   a first partial region having a first side configured to face a vehicle interior, and a second side opposite the first side;
   a second partial region having a honeycomb structure configured to absorb energy from an impact; and
   a connecting region integrally coupled to the first partial region, and to the second partial region, wherein the connecting region comprises a film hinge, and the first partial region and the second partial region comprise fastening elements;
   wherein the film hinge is configured to facilitate rotation of the second partial region relative to the first partial region from a molded position to a preassembled position in which the second partial region is folded about 180 degrees onto the second side of the first partial region such that an entire portion of the honeycomb structure of the second partial region is in a facing relation with the second side of the first partial region;
   wherein the fastening elements are configured to secure the first partial region to the second partial region when the second partial region is in the preassembled position; and
   wherein the second partial region includes a dish-shaped structure, and the dish-shaped structure and the second side of the first partial region substantially surround the honeycomb structure when the second partial region is in the preassembled position, such that the honeycomb structure is not visible.

7. The fixture as claimed in claim 1, wherein the dish-shaped structure and the back side of the first partial region substantially surround the honeycomb structure when the second partial region is pre-assembled relative to the first partial region, such that the honeycomb structure is not visible.

8. A fixture for an interior of a motor vehicle, comprising a first partial region and a second partial region, the first partial region being integrally connected to the second partial region by a connecting region, wherein the first partial region is provided such that the first partial region may be pre-assembled relative to the second partial region by the connecting region, the first partial region has a front side on a side remote from the second partial region when pre-assembled relative to the first partial region, the front side is visible by an occupant of the motor vehicle when the fixture is installed within the motor vehicle, the first partial region has a back side opposite the front side, the first partial region comprises a cladding function, and the second partial region comprises a honeycomb structure, a dish-shaped structure around the honeycomb structure, and a damping function;
   wherein the first partial region and the second partial region comprise fastening elements for pre-assembling the first partial region relative to the second partial region, and the connecting region comprises a film hinge; and
   wherein the second partial region is folded about 180 degrees onto the back side of the first partial region when pre-assembled by bending the film hinge such that an entire portion of the honeycomb structure of the second partial region is in a facing relation with the back side of the first partial region, and the second partial region is latched to the back side of the first partial region when pre-assembled by the fastening elements.

9. The fixture as claimed in claim 8, wherein the dish-shaped structure and the back side of the first partial region substantially surround the honeycomb structure when the second partial region is pre-assembled relative to the first partial region, such that the honeycomb structure is not visible.

* * * * *